Feb. 2, 1926.  1,571,416
A. P. JOHNSTON
MULTIGRAPH RAIL SOLDERING MACHINE
Filed August 11, 1922   2 Sheets-Sheet 1
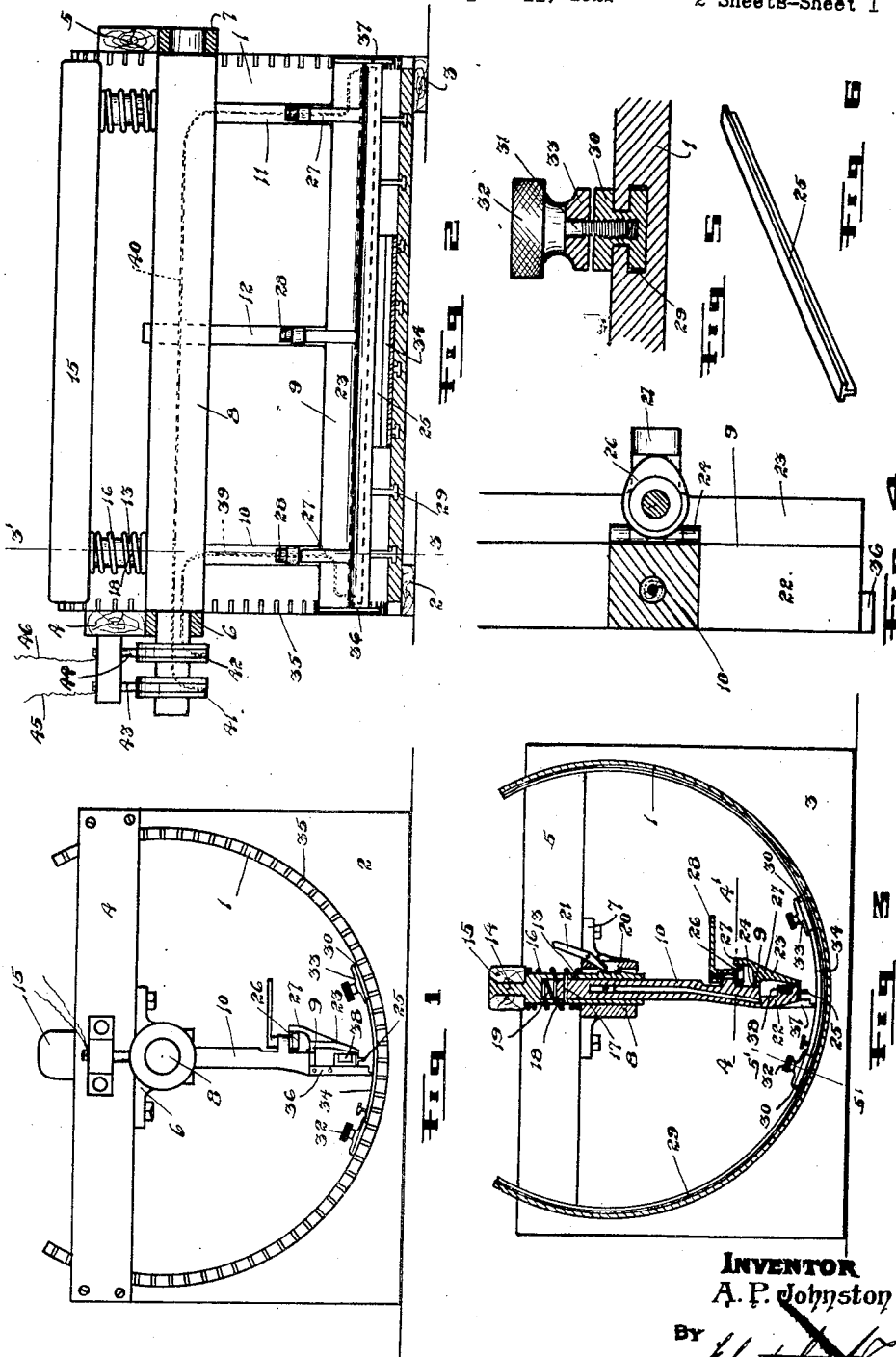
INVENTOR
A. P. Johnston
BY
ATTYS Feb. 2, 1926.
A. P. JOHNSTON
1,571,416
MULTIGRAPH RAIL SOLDERING MACHINE
Filed August 11, 1922   2 Sheets-Sheet 2
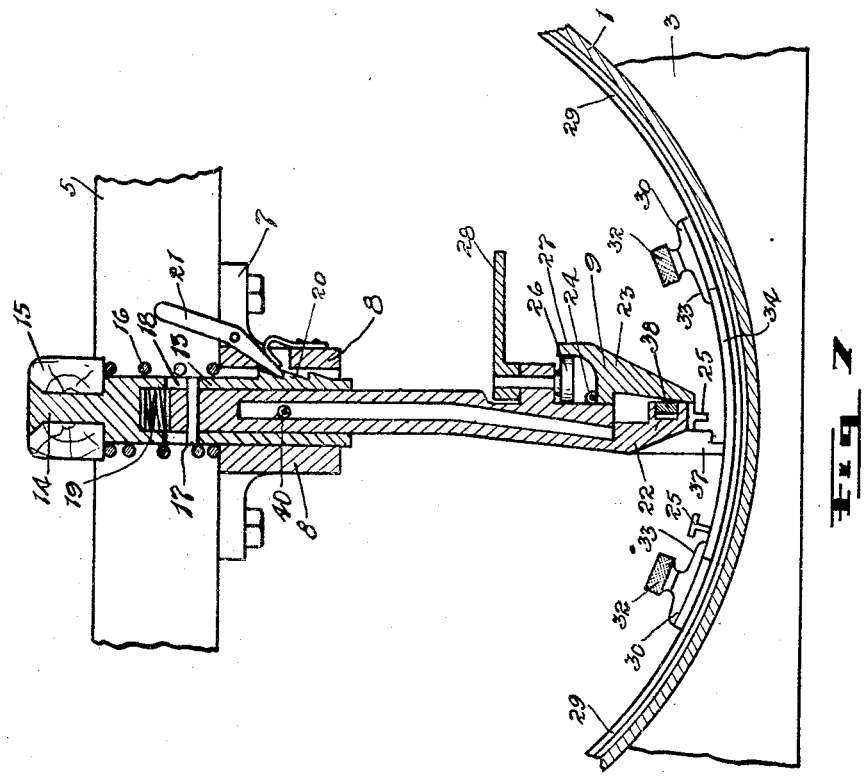
Inventor
A. P. Johnston
By Patented Feb. 2, 1926.

1,571,416

UNITED STATES PATENT OFFICE.

ALFRED PETER JOHNSTON, OF WINNIPEG, MANITOBA, CANADA.

MULTIGRAPH RAIL-SOLDERING MACHINE.

Application filed August 11, 1922. Serial No. 581,201.

*To all whom it may concern:*

Be it known that I, ALFRED PETER JOHNSTON, of the city of Winnipeg, in the Province of Manitoba, Canada, have invented certain new and useful Improvements in Multigraph Rail-Soldering Machines, of which the following is the specification.

The invention relates to improvements in multigraph rail soldering machines and an object of the invention is to provide a machine for electrically soldering the rails to the electrotype or stereotype plates and to construct the machine so that the work can be done quickly and accurately.

A further object of the invention is to construct the machine so that it can be readily manipulated to electrically solder any number of properly spaced rails to the plates, whether the plates be large or small, and to provide the machine with setting and locking means which will positively insure of the rails being accurately set in respect to the plate and in respect one to the other and to conform with the channels or slots of the multigraph cylinder on which the plates are applied during the printing operation.

With the above more important objects in view the invention consists essentially in the arrangement and construction of parts hereinafter more particularly described and later pointed out in the appended claims, reference being had to the accompanying drawing in which:

Fig. 1 is an end view of the machine.

Fig. 2 is a vertical sectional view longitudinally and centrally through the machine, certain parts being shown in side elevation.

Fig. 3 is a vertical cross sectional view through the machine at 3—3′ Fig. 2.

Fig. 4 is an enlarged detailed horizontal sectional view at 4—4′ Fig. 3.

Fig. 5 is an enlarged detailed horizontal sectional view at 5—5′ Fig. 3.

Fig. 6 is a perspective view of one of the rails.

Fig. 7 is an enlarged detailed sectional view of the construction illustrated in Fig. 3.

In the drawing like characters of reference indicate corresponding parts in the several figures.

I may initially explain that electrotype or stereotype plates are at the present time provided with attaching rails for connecting the said plates to the cylinder or drum of the multigraph machine with which the plates are used in printing. At the present time, as far as I am aware, the rails are either cast on the plates or soldered to them by hand work. Both these operations are expensive and the latter one takes considerable time and care. The machine which I have devised solders the rails accurately to the plates electrically and is now described in detail.

A metallic drum or shell 1 is provided, the drum having the ends open and the top partially cut away to allow of the manipulation of the operation parts. The drum is suitably carried by end pieces 2 and 3 in the form of supporting cradles. To the cradles I secure elevated opposing horizontally disposed end beams 4 and 5 and these beams are provided centrally and on the underside with aligned bearings 6 and 7 which support rotatably the ends of a lengthwise extending shaft 8. The shaft carries a clamp 9 which is supported by two end arms 10 and 11 and a central arm 12 extending from the shaft. The central arm 12 passes slidably through the shaft whilst the end arms 10 and 11 are mounted for sliding movement, but in a peculiar manner now described:

The upper end of each arm is received slidably within a tube 13 and the tube passes slidably through the shaft 8 and has its upper end terminating in each instance in a closed head which is provided with an extending riveted pin 14 which fastens a handle 15 to the head. As will be observed in Fig. 2 the handle connects the tubes of the end arms together. A coiled spring 16 envelops each tube and has the ends thereof engaging with the shaft 8 and handle 15, the springs normally acting to hold the tubes in an upper non-working position. The upper ends of the arms 10 and 11 are each provided with cross pins 17 which operate within slots 18 provided in the sides of the tubes. A coiled spring 19 is interposed between the head of each tube and the upper end of the arm, such latter springs normally exerting a downward pressure upon the arms.

According to the above arrangement it will be apparent that when one presses downwardly on the handle he will force both the arms 10 and 11 downwardly and so cause the clamp to pass toward the inner face of the drum, it being here understood that the longitudinal axes of the shaft and drum coincide.

In order to permit of the locking of the clamp in a depressed or down position I have provided the sides of each tube 13 with ratchet teeth 20 which are engaged by a spring pressed dog 21 carried by the shaft 8. The clamp presents a stationary jaw 22 and a pivoted jaw 23 hinged to the stationary jaw throughout its length at 24. The lower ends of the jaws are designed such that they will receive, grip and hold the T-shaped rail 25 as used with electrotype or stereotype plates. The manner in which the rail is caught is best shown in Figures 1 and 3 and it will here be observed that the main web of the rail is exposed towards the drum.

Suitable means are provided for insuring of the effective gripping of the rail, such in the present instance being by means of eccentric cams 26 located behind upstanding arms 27 carried by the pivoted jaw and operated by levers 28. Obviously, in the turning of the levers in the proper direction the cams will cause the pivoted jaw to tightly grip the inserted rail head.

The inner face of the drum 1 is provided with a plurality of suitably spaced T-shaped slots 29 passing circumferentially of the drum and adapted to receive slidably more or less spool-shaped slides 30, the slides being provided with screw threaded openings receiving adjusting pins 31. The adjusting pins are fitted with finger pieces 32 and they carry substantially rectangular clamping plates 33. Any number of these slides can be used, their purpose being to firmly fasten within the drum the electrotype or stereotype plate 34 to which the rails are to be soldered. This plate 34 is of the ordinary form and its curvature is such that it will fit the face of the cylinder of the multigraph machine on which it is to be used.

The drum 1 which I provide is curved to fit the convex side of the plate 34. This plate may be large or small and after it is put in the drum it is securely fastened thereto by utilizing the slides. The fastening is actually made by turning the plates 33 so that they will overhang the edges of the electrotype or stereotype plate and then tightening up the screws 31 by manipulating the finger pieces until the clamping plates 33 tightly clamp the electrotype or stereotype plate in place.

The arrangement of the clamp 9 and parts associated therewith is such that one can swing the clamp up so that it is exposed above the drum, then put the rail in place between the jaws and fasten it and subsequently swing the clamping plate down into the drum into the position as shown in Fig. 3 and finally depress the clamp by manipulating the handle 15 to bring the web of the rail in contact with the inner face of the electrotype or stereotype plate. In this connection it is pointed out that when the rail has been brought into contact with the latter plate it is locked in such position by the dogs and at this time the springs 19 are exerting a downward pressure on the arms 10 and 11 to maintain the rail tightly pressed against the plate.

The cylinders of multigraph machines are provided with slots to receive the rails of the plates and as these slots are a fixed or predetermined distance apart it is necessary that the rails be soldered accurately on the plates in my machine a corresponding pre-selected distance apart as otherwise they would not enter the slots of the multigraph machine cylinder. To insure of this I have formed spaced notches 35 in the ends of the drum 1, these notches being spaced apart a distance equal to the distance between the slots or grooves in the cylinder of the multigraph machine.

The stationary jaw of the clamp 9 is provided at the ends with fingers 36 and 37 which are adapted, when the clamp is pressed toward the drum, to enter the notches 35. This latter arrangement insures of the proper spacing of the rails on the face of the plate 34.

The stationary jaw of the clamp 9 is profitted with an electrical heating element 38 of any approved type and lead wires 39 and 40 connect with the ends of the element, the wires passing through the shaft 8 and through suitable passages provided in the arms 10 and 11, said passages being constructed to permit of the sliding movement of the arms without binding due to the wires. The wires 39 and 40 are electrically connected to suitably insulated rings 41 and 42 carried by the shaft and brushes 43 and 44 contact with the rings, the brushes being in circuit with a suitable source of electromotive force through the feed wires 45 and 46.

The electrical heating element is located such that it is very close to the clamped rail, with the result that when the element heats the rail will be heated to a sufficient temperature to permit of the electrical soldering of the rail to the electrotype or stereotype plate. In actual practice one will turn the clamping bar to the top and initially heat it in this position. He will then apply a suitable flux and the solder to the exposed edge of the rail web. The handle 15 will then be manipulated to bring the clamp and rail caught thereby into a position over the electrotype or stereotype plate fastened in the drum. The handle 15 will then be pressed down to bring the rail in tight contact with the plate and the final soldering will then be effected. At this time the fingers 36 and 37 are in the notches 35.

In Figures 1 and 3 I have shown one rail soldered in place and a second rail about ready to be attached. After the first rail is soldered the operation is duplicated for the second rail or any other number required, depending on the size of the plate, and one is at all times positive that the rails are accurately aligned and spaced as the clamp holds the rails accurately longitudinally of the drum and the fingers, co-acting with the notches 35, space the rails to conform to the grooves or slots of the cylinder of the multigraph machine.

Whilst I have entered into a detailed description of the various parts I wish it to be understood that I do not wish to be limited to the precise construction therein shown as obviously the various parts could be materially structurally modified, without departing from the spirit of the invention as set forth in the accompanying claims.

What I claim as my invention is:

1. In a multigraph rail soldering machine, the combination with an electrotype or stereotype plate and a rail, of a suitably mounted partial drum adapted to receive the plate, means for releasably fastening the plate to the drum, a rotatably mounted shaft passing axially through the drum, a clamp carried by the shaft and supporting the rail, said clamp being movable towards and away from the plate and means for heating the rail carried by the clamp.

2. In a mutigraph rail soldering machine, the combination with an electrotype or stereotype plate and a rail, of a suitably mounted partial drum adapted to receive the plate, means for releasably fastening the plate to the drum, a rotatably mounted shaft passing axially through the drum, a clamp carried by the shaft and supporting the rail, said clamp being movable towards and away from the plate, means for heating the rail carried by the clamp and means for positively setting the clamp in respect to the plate in the engaged position of the rail with the plate.

3. In a multigraph rail soldering machine, the combination with an electrotype or stereotype plate and a rail, of a partial suitably mounted stationary drum receiving and supporting the plate, releasable means for attaching the plate to the inner face of the drum, a suitably mounted rotatable shaft passing axially through the drum, a clamp carrying the rail and operating within the drum and carried by the shaft, said clamp turning with the shaft and being mounted for radial movement, means associated with the clamp for heating the rail carried thereby and means for locking the clamp in preselected positions in respect to the drum.

4. In a multigraph rail soldering machine, the combination with an electrotype or stereotype plate and a rail, of a partial suitably mounted stationary drum receiving and supporting the plate, releasable means for attaching the plate to the inner face of the drum, a suitably mounted rotatable shaft passing axially through the drum, a clamp carrying the rail and operating within the drum and carried by the shaft, said clamp turning with the shaft and being mounted for radial movement, means associated with the clamp for heating the rail carried thereby, means normally maintaining the clamp in a retracted position away from the plate, releasable means for locking the clamp in a depressed position with the rail contacting with the plate and means for automatically locking the clamp in a preselected position in respect to the drum during the depression of the clamp.

Signed at Winnipeg, this 26th day of July, 1922.

ALFRED PETER JOHNSTON.